A. D. CAMERON.
LEAF SPRING.
APPLICATION FILED JAN. 15, 1916.
1,220,396. Patented Mar. 27, 1917.
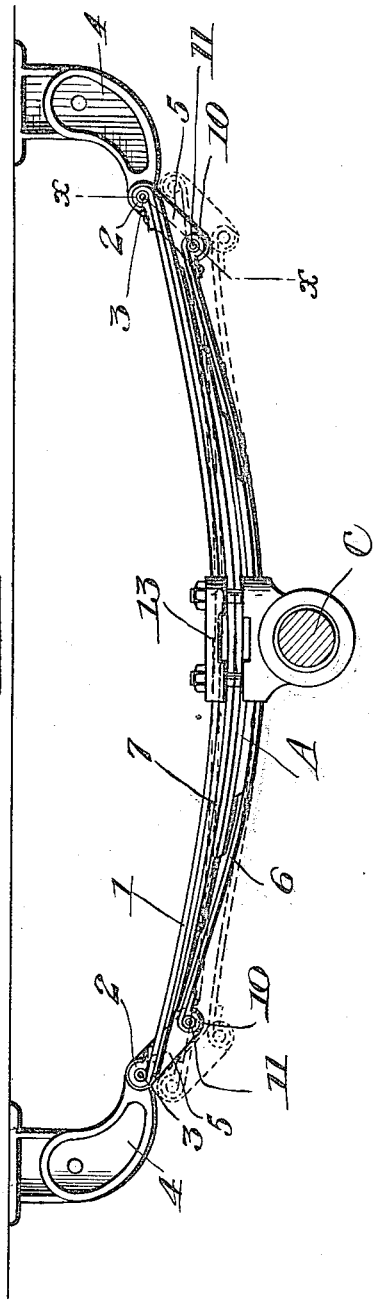
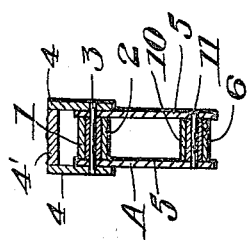
WITNESS
INVENTOR
A. D. CAMERON.
BY Fetherstonhaugh & Co.
ATTYS.

UNITED STATES PATENT OFFICE.

ANGUS DANIEL CAMERON, OF SUMMERSTOWN FRONT, ONTARIO, CANADA, ASSIGNOR TO LISTER ABRAHAM CHITTENDEN, OF MASSENA, NEW YORK.

LEAF-SPRING.

1,220,396.  Specification of Letters Patent.  Patented Mar. 27, 1917.

Application filed January 15, 1916. Serial No. 72,252.

*To all whom it may concern:*

Be it known that I, ANGUS DANIEL CAMERON, a subject of the King of Great Britain, and resident of Summerstown Front, in the Province of Ontario, Dominion of Canada, have invented certain new and useful Improvements in Leaf-Springs, of which the following is the specification.

This invention relates to improvements in leaf springs and particularly refers to the arrangement of the leaves thereof, and the objects of the invention are to prevent damage to the spring on rebound and to lift the several leaves uniformly and together when the load is released. Further objects are to render the spring capable of automatically responding to slight variations of load, to obviate jarring, to more advantageously distribute the load to the several leaves, and generally to adapt the spring to better perform the functions required of it, and it consists essentially of the improved construction particularly described and set forth in the following specification and accompanying drawings forming part of the same.

In the drawings,

Figure 1 shows a side elevation of an embodiment of the invention.

Fig. 2 is a section on the line X—X.

Like characters of reference refer to like parts in the several figures.

Referring to the drawings, A represents the improved spring comprising the upper master leaf 1 having tubular ends 2 embracing a pin 3 supported from the bracket 4 which is pivotally connected to a lug 4' attached to the vehicle body. 5 represents a link, one end of which is pivotally connected to a lower master leaf 6 which extends along the outer side of a plurality of superimposed leaves 7, which leaves gradually vary in length with the shortest adjacent to and engaging the lower master leaf 6. The leaf 6 is formed with tubular ends 10 which embrace pivot pins 11 on the links 5.

The lower master leaf 6 fits closely to the edges of the superimposed leaves 7 whereby when the spring is rebounding from the position shown in dotted lines the ends of the leaves will not be permitted to rebound singly which would cause them to break. In other words, they must all operate in unison.

The upper and lower master leaves 1 and 6 together with the leaves 7 are held in assembled position by a suitable yoke 13 to which the vehicle axle C is connected.

The leaves 7 of varying lengths which are interposed between the master leaves, as above stated, have their ends in contact with the lower master leaf 6 so that when the load is applied to the said lower master leaf it is simultaneously applied to all of the leaves 7.

By positioning the shortest leaf 7 at the bottom adjacent to the lower master leaf 6 with the next shorter next above and so on it will be seen that the overlapping ends of the upper adjacent leaves has its full share of the load, and this it will be understood would not be the case if the position of the leaves 7 was reversed.

The spring, as shown, is in its normal position. The dotted lines show the position taken when a sudden load is placed on the spring. It will be seen that on the rebound from the position shown in dotted lines, the lower master spring 6 will bear against the end of the leaves 7 and prevent the leaves from springing away from each other on the rebound. It will also prevent the leaves from springing away from the master leaf. In this way each leaf of the spring by bearing against the master leaf 6, which serves also as a retaining member, will tend to prevent the spring as a whole from passing its normal position in the reverse direction.

What I claim as my invention is:

The combination with a leaf spring consisting of a plurality of superimposed leaves of different lengths, of a lower master leaf provided with tubular ends designed to lie along the lower face of the spring and intimately engage the ends of all the leaves, and links pivotally connecting the ends of the upper leaf of the spring with the tubular ends of the lower master leaf, as and for the purpose specified.

In witness whereof I have hereunto set my hand in the presence of two witnesses.

ANGUS DANIEL CAMERON. [L. S.]

Witnesses:
WILBER R. HITCHCOCK, [L. S.]
ANNE MACAULEY. [L. S.]

Copies of this patent may be obtained for five cents each, by addressing the "Commissioner of Patents, Washington, D. C."